United States Patent [19]

Brum

[11] 4,366,756

[45] Jan. 4, 1983

[54] ELECTRONIC TRACTOR GUIDANCE SYSTEM

[75] Inventor: Jerry W. Brum, Modesto, Calif.

[73] Assignee: Geosource Inc., Houston, Tex.

[21] Appl. No.: 185,410

[22] Filed: Sep. 9, 1980

[51] Int. Cl.³ .......................... B61F 9/00; B62D 5/04
[52] U.S. Cl. ................................ 104/244.1; 180/131; 180/79.1
[58] Field of Search ............... 104/244.1, 247; 180/79, 180/79.1, 79.3, 131, 167; 56/10.2, DIG. 15; 172/23, 26; 340/53

[56] References Cited

U.S. PATENT DOCUMENTS

| | | | |
|---|---|---|---|
| 2,068,403 | 1/1937 | Ekstrom | 46/201 |
| 3,039,554 | 6/1962 | Hosking et al. | 180/79 X |
| 3,180,280 | 4/1965 | Kuch et al. | 104/245 |
| 3,188,978 | 6/1965 | Dolphin et al. | 104/247 |
| 3,254,608 | 6/1966 | Alden | 104/149 |
| 3,402,784 | 9/1968 | Roberson et al. | 180/79 |
| 3,492,949 | 2/1970 | Brown | 104/244.1 |
| 3,537,531 | 11/1970 | Fischer | 172/26 |
| 3,581,838 | 6/1971 | Rhodes | 180/79 |
| 3,633,701 | 1/1972 | LeTourneau | 180/79.1 |
| 3,708,029 | 1/1973 | Sedgefield et al. | 180/79 |
| 3,765,501 | 10/1973 | Burvee | 180/79.2 |
| 3,797,602 | 3/1974 | Sumida | 180/79.1 |
| 3,844,372 | 10/1974 | Neece | 180/79.1 |
| 3,933,215 | 1/1976 | Scheuerle | 180/23 |
| 3,939,938 | 2/1976 | Inoue | 180/79.2 |
| 3,946,825 | 3/1976 | Gail | 180/131 |
| 3,982,603 | 9/1976 | Michael | 180/131 |
| 4,032,758 | 6/1977 | Lewis | 235/150.2 |
| 4,161,143 | 7/1979 | Fasse et al. | 104/244.1 |
| 4,165,796 | 8/1979 | Petz | 180/131 |
| 4,184,551 | 1/1980 | Orthman | 172/26 |
| 4,219,093 | 8/1980 | Lang | 180/131 |
| 4,301,739 | 11/1981 | Mehren et al. | 104/247 |
| 4,304,316 | 12/1981 | Lang | 180/131 |

FOREIGN PATENT DOCUMENTS

958094  5/1964  United Kingdom .

Primary Examiner—Randolph Reese
Attorney, Agent, or Firm—Arnold, White & Durkee

[57] ABSTRACT

An automatic tractor guidance system for controlling the steering of a tractor to follow a previously plowed furrow is disclosed. A furrow follower is provided with a sensor for sensing the direction of the path relative to the direction of travel of the tractor. The steering direction of the tractor is likewise sensed. The two sensor signals are combined and compared to a convergence frequency signal to produce a digital control signal. Each logic state of the control signal effects a turn in the steering of the tractor, right then left. If the duty cycle of the control signal is 50%, no net turn either right or left is effected. However, when the duty cycle deviates from 50%, a net rotation in one direction or the other will occur depending on which logic state of the digital signal occurs for a longer portion of each cycle of the control signal. Also provided is an offset adjustment to adjust the steering direction of the tractor to compensate for forces acting on the tractor which tend to change the direction of travel of the tractor without an accompanying steering control change.

15 Claims, 8 Drawing Figures

ELECTRONIC TRACTOR GUIDANCE SYSTEM

BACKGROUND OF THE INVENTION

This invention relates generally to automatic guidance control systems for controlling the direction of travel of a moving vehicle to follow a prescribed path. More particularly, the present invention relates to an automatic guidance control system for guiding an agricultural tractor to follow a previously plowed furrow or guiding means in a field under cultivation.

The need to produce the maximum amount of agricultural products from a given amount of acreage is becoming more and more important as the result of an ever increasing demand for these products and the increasing costs to produce them. To meet this growing demand, it is necessary that the land under cultivation be plowed and planted so that there is little wasted land. Each plowed furrow should be parallel with all other furrows and spaced at very accurate seperation distances.

Prior-art tractor guidance systems have been constructed to guide the path of the tractor to follow a previously plowed furrow. However, these prior-art guidance systems are, for the most part, complicated mechanical-hydraulic contrivances that lack the sensitivity necessary to optimally control the direction of travel of the tractor to follow a previously plowed furrow. Additionally, these types of prior-art devices are only effective when used on tractors which have closed center hydraulic systems. Not all tractors come so equipped. Another problem not solved by these prior-art devices occurs from external forces which act on the tractor and the implements being pulled to force the tractor to deviate in its direction of travel, without a change in the tractor's steering direction. These external forces result from such things as the particular elevation and degree of slope of the ground, i.e., plowing on the side of a hill, slippage of the tractor wheels, changes in soil structure and from other sources. To ensure that the tractor travels in the proper direction to produce the desired plowed furrows or results encompassing other production operations, such external forces must be overcome by effectively steering the tractor in a direction slightly deviating from the actual direction of travel.

Accordingly, it would be advantageous to provide a simple mechanical-electrical automatic tractor guidance system that could be easily installed on existing tractors of whatever kind to provide an accurate and sensitive electrical steering control to guide the tractor to follow previously plowed furrows. Additionally, it would be advantageous to provide an automatic tractor guidance system which adjusts for external forces tending to force the tractor to deviate from the desired direction of travel.

SUMMARY OF THE INVENTION

In accordance with the present invention, an automatic guidance system for controlling the direction of travel of a tractor along a guide path is disclosed. The guidance system consists of two sensors, a direction sensor connected to the tractor for sensing the direction of the guide path relative to the direction of travel of the tractor, and a tractor steering sensor connected to the steering means of the tractor to detect the steering direction of the tractor. Both the direction sensor and the tractor steering sensor are sensitive rotary variable differential transformers that produce DC output voltages proportional to the angular position of the sensor's shaft.

In the case of the direction sensor, a furrow follower assembly controls the angular position of the direction sensor's shaft to produce a path direction signal that indicates the relative direction of the path to the direction of travel of the tractor. In the case of the tractor steering sensor, angular rotation of the sensor's shaft is controlled by rotation of the front steering wheels of the tractor. In this manner, the steering direction of the tractor is sensed to generate a steering direction signal.

The guidance system further includes a tractor steering means attached to the steering column of the tractor to provide rotation of the steering wheel under control of the guidance system. The tractor steering means includes a permanent magnetic DC motor coupled to the steering column through a gearing arrangement or by sprockets and chain. Also included is a control means that responds to the path direction signal from the direction sensor and the steering direction signal from the tractor steering sensor to produce a steering control signal. The steering control signal is a digital signal having a duty cycle which varies with the magnitude of the difference between the path direction signal and the steering direction signal. A steering change to the tractor is effected if the duty cycle of the steering signal deviates from a 50% duty cycle.

In operation, the control means amplifies the signals from the two sensors to respectively obtain the path direction signal and the steering direction signal. A bipolar offset control voltage is generated and subtracted from the path direction signal to produce a furrow error signal. The bipolar offset control voltage adjusts for the side forces acting on the tractor to alter the tractor's direction of travel even though a change in the steering direction of tractor was not made. A steering error amplifier responds to the steering direction signal and the furrow error signal to generate a steering error signal that ultimately will determine whether a steering change will occur to the tractor.

A convergence control oscillator is provided for generating a bipolar convergence frequency signal that is compared with the steering error signal to produce the variable duty cycle steering control signal. A comparison means is provided to compare the convergence frequency signal and the steering error signal. For the presently preferred embodiment of the present invention, the convergence frequency signal is a bipolar triangular wave form. When the magnitude of this convergence frequency signal is greater than the steering error signal, a digital logic state is generated for the steering control signal, and if the magnitude of the convergence frequency signal is less than the steering error signal, the opposite digital logic state is produced.

When the steering control signal is in one logic state, a right-turn signal is generated to the DC motor controlling the steering column of the tractor, while in the opposite logic state, a left-turn control signal is delivered to the motor. In this manner, during each cycle of the convergence frequency signal, a command to the steering motor to both turn right and to turn left is given. If the duty cycle of the steering control signal is 50%, no net effective turn occurs in the steering. However, any variation of the duty cycle, either above or below 50%, will respectively result in an effective net turn to the right or to the left.

A BRIEF DESCRIPTION OF THE DRAWING

An automatic tractor guidance system constructed in accordance with the preferred embodiment of the invention is illustrated in the accompanying drawings in which.

Similar reference numerals refer to similar parts throughout the several views of the drawings.

DETAILED DESCRIPTION OF A PREFERRED EMBODIMENT OF THE INVENTION

Figure 1:
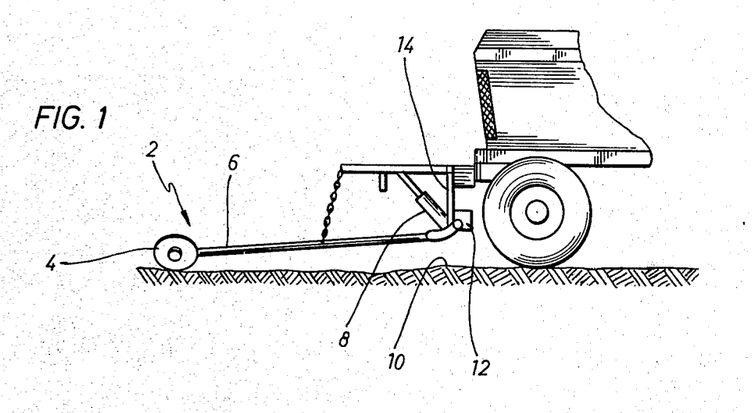
FIG. 1 is a side view of the furrow follower assembly attached to the front end of a typical tractor.

Referring to the figures, and first to FIG. 1, a furrow follower assembly 2 for sensing the direction of a guide path, such as a previously plowed furrow, is shown. A more detailed description of the furrow follower assembly 2 is given in U.S. Pat. No. 4,165,796 issued to Petz and such disclosure is herein incorporated by reference. A boom 6 has attached at its sensing end two dish shaped plates 4 which lie within and follow the tapering sides of a plowed furrow. Connected to the opposite end of boom 6 is direction sensor 12. Direction sensor 12 is mounted to the plate 14 such that side-to-side displacement of the boom 6 relative to the direction of travel of the tractor produces a rotation of the shaft of sensor 12. A DC analog voltage is produced on the output of sensor 12 as a function of the angular position of its shaft. Therefore, rotation of the angular shaft by the furrow follower sensing assembly 2 produces a change in the voltage generated by sensor 12. The furrow sensing assembly 2 is provided with a hydraulic piston 8 actuated in response to electrical signals to raise and lower the boom 6. In operation, the boom 6 is lowered so that the dish plates 4 will be contacting the furrow along which the tractor will be guided. Any deviation of the direction of travel of the tractor to the direction of the path will be reflected as a change in the output of sensor 12.

Figure 2:
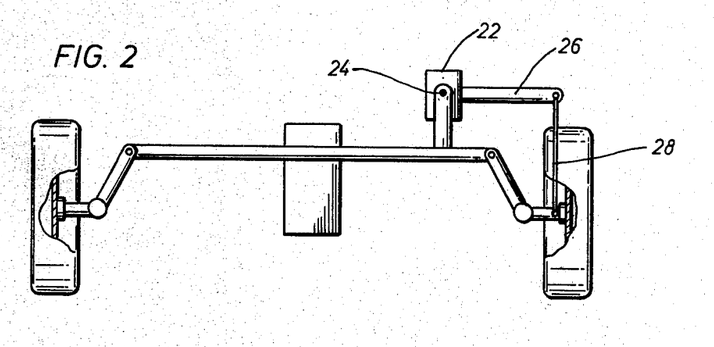
FIG. 2 is a top view of a typical steering linkage arrangement showing the steering sensor connected for sensing the steering direction of the tractor.

Turning now to FIG. 2, the front steering linkages of the tractor are diagrammatically illustrated showing how the tractor steering sensor 22 is coupled to the steering linkages of the tractors front wheels to provide a DC error signal indicating the steering direction of the tractor. For the most part, the steering direction of the tractor will be the direction of travel of the tractor. However, when the tractor is being acted upon by external forces, such as slippage of the tractor wheels, plowing on the side of a slope, etc., the tractor steering may not necessarily be in the direction of travel of the tractor. In order to overcome the side forces, the steering of the tractor must be effected in a direction to overcome these side forces. By so doing, the direction of travel of the tractor can be maintained in the desired direction. Steering sensor 22 is identical to sensor 12, and functions to produce a DC analog voltage as a function of the angular position of the sensors input shaft. By modulating the angular position of sensor 22's shaft as a function of the front wheel positions, a feedback error signal can be generated as a function of the steering direction of the tractor. For the presently preferred embodiment, sensors 12 and 22 are both sold by Schaevitz Engineering as their model R30D rotary variable differential transformers. These units were selected because they exhibited zero volts out when the angular position of the shaft is at a reference position, regardless of variations in the supply voltages delivered to the units. This predictability in the output voltage eliminates the need for complicated offset error adjustments in the electronics to compensate for system power supply variations.

Figure 3:
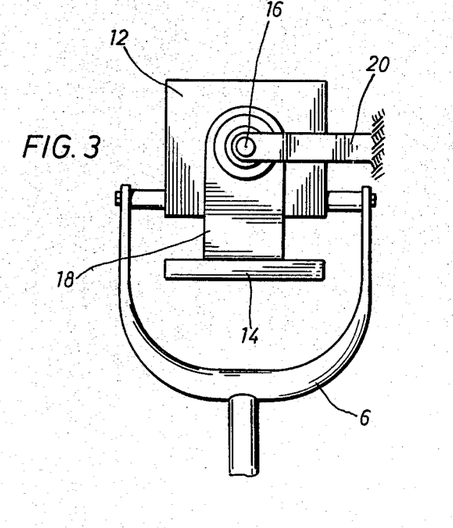
FIG. 3 is a view from above of the direction sensor coupled to the furrow follower sensing boom mounted to the front end of the tractor.

Turning now to FIG. 3, a view of the sensor 12 and boom 6 as viewed from above, is illustrated. The boom 6 provides a U-shaped yolk connection to the housing of the sensor 12, while the shaft 16 of the sensor is fixedly secured to the frame of the tractor by bracket 20. Brackets 18, 14 provide mechanical support for the sensor assembly while permitting the housing of sensor 12 to rotate relative to its shaft 16. Should the direction of travel of the tractor deviate from the direction of the path, the housing of sensor 12 will be rotated by displacement of the boom 6 attached thereto. This rotation will be reflected as a change in the DC output voltage from the sensor 12.

Figure 4:
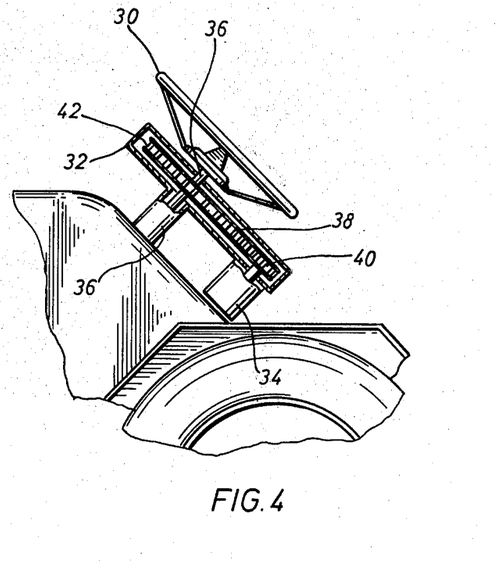
FIG. 4 is an illustration of the control motor assembly for controlling the steering column of the tractor.

Referring now to FIG. 4, an illustration of the steering control means for effecting rotation of the steering column of the tractor in response to the control signals from the guidance control system is shown. A permanent magnet DC servo motor 34 is shown connected to the steering column 36 of the tractor via a combination of sprockets 40, 42 connected together by a continuous chain 38. Sprocket 40 is mounted to the shaft of the DC motor 34, while sprocket 32 is connected to the steering shaft 36 of the tractor. Continuous chain 38 transfers the torque produced by the DC motor 34 to the steering column 36. In this manner, rotation of steering motor 34 produces rotation of the steering column 36. For the presently preferred embodiment of the invention, the permanent magnet DC motor is an Indiana General model 4010-W19-01.

Figure 5:
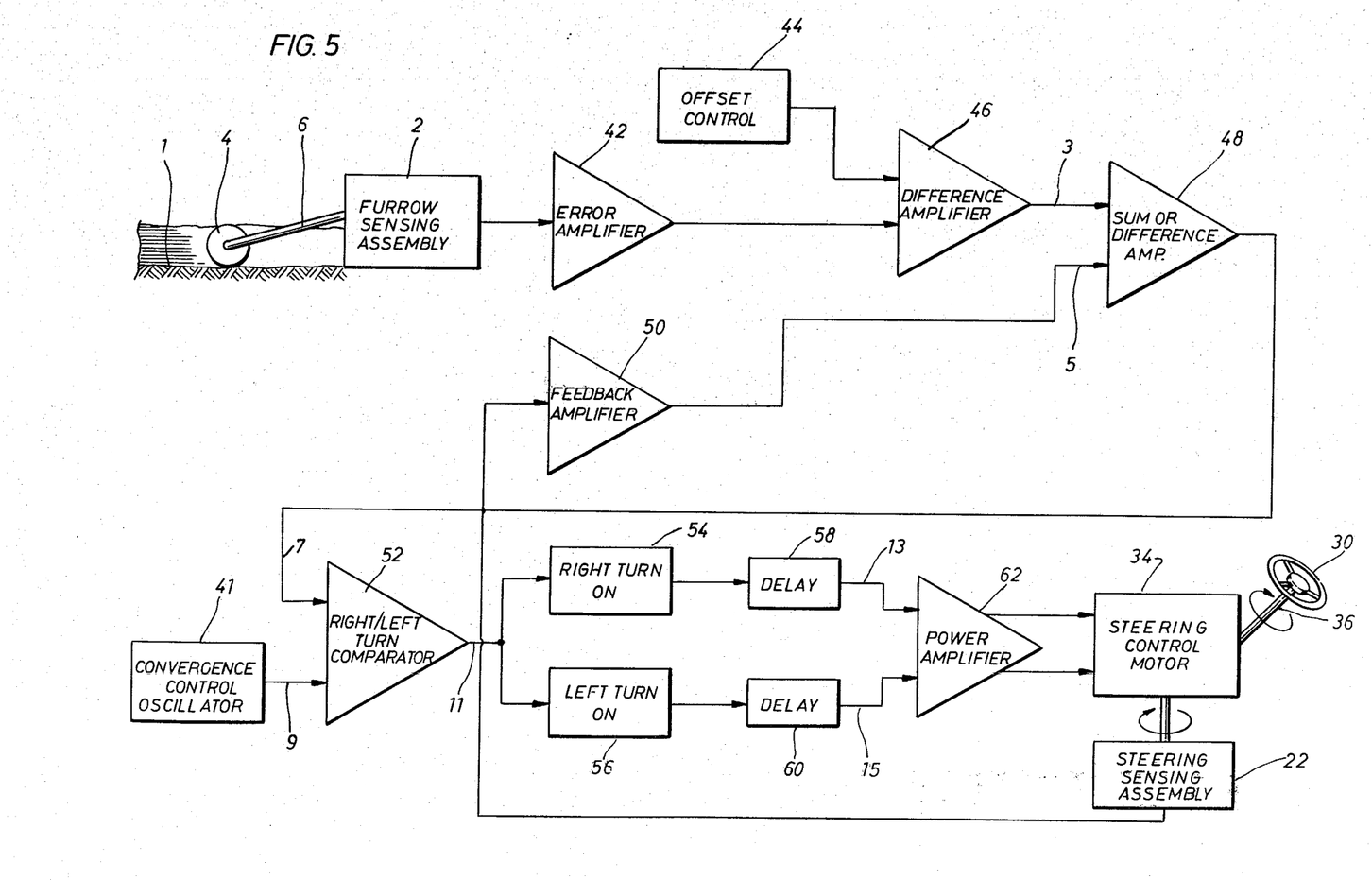
FIG. 5 is a schematic blocked diagram of the control means of the present invention.

Turning now to FIG. 5, a block diagram of the control means of the automatic guidance system of the invention is shown. The furrow sensing assembly 2, including the boom 6 and furrow sensing dishes 4, are shown sensing the direction of furrow 1. The output signal from the sensor 12 contained in the furrow sensing assembly 2 is inputted into error amplifier 42. Similarly, the feedback error signal from the steering sensor 22, illustrated in FIG. 2, is inputted to a feedback amplifier 50 identical to the error amplifier 42. Amplifier 42 produces the path direction signal on its output, while feedback amplifer 50 produces the steering direction signal 5.

Further shown in FIG. 5 is an offset control 44 which generates a bipolar switch selectable control offset voltage to compensate for the side forces acting on the tractor which tend to cause the direction of travel of the tractor to change. This offset control voltage is inputted with the path direction signal to a differencing amplifier 46 which subtracts the two signals and produces the furrow error signal 3 on its output. The furror error signal 3 is then inputted, along with the steering direction signal 5 from feedback amplifier 50 into a sum and difference amplifier 48. Sum or difference amplifier 48 generates both the sum of the furrow error signal 3 and the steering direction signal 5, and the difference of these two signals. Jumper selection (see FIG. 6) is provided on the output of the sum or difference amplifier 48 to enable either combination of the furrow error signal 3 and the steering direction signal 5 to be selected as the steering error signal 7. For some tractor installations, it may not be possible to mount the steering sensing assembly 22 to produce a particular direction change in its output signal for a particular change in the steering direction of the tractor. Although the magnitude of the change as a function of the steering change will be the same, its polarity may be different from tractor to tractor. Accordingly, by providing both a sum and a differencing function in the sum or difference amplifier 48, the appropriate combination of the furrow error signal 3 and a steering direction signal 5 can be selected to obtain the required steering error signal 7.

Still referring to FIG. 5, the steering error signal 7 is shown inputted along with convergence frequency signal 9 from convergence control oscillator 41 to right-/left turn comparator 52. The function of comparator 52 is to produce a digital right/left turn signal 11 in which one logic state of the digital signal occurs when the magnitude of the convergence frequency signal 9 is greater than the magnitude of steering error signal 7, while the opposite logic state obtains when frequency signal 9 is less than the steering error signal 7. The frequency of the right/left turn signal will be equal to the fundamental frequency of the convergence frequency signal 9. By assigning a right turn function to the logic one state of the signal 11 and a left turn control signal to the logic zero state and applying this control signal to the steering motor 34 controlling the steering of the tractor, it is possible to effect control of the steering of the tractor as a function of the duty cycle of the right/left turn signal 11. That is, during each cycle of the convergence oscillator frequency signal 9, both a right and a left turn will be applied to the steering motor 34. If the duty cycle of the right/left turn signal 11 is 50%, there will be no net turning effected to the steering shaft 36. However, if the duty cycle of the signal deviates from 50%, more time will be devoted to a right or to a left turn than for the other one. Therefore, a net rotation in the steering column 36 occurs. The steering control is always in a direction to bring the duty cycle of the right/left turn signal 11 back to 50%.

The rate of convergence of the steering control to achieve the desired 50% duty cycle—the effective rate at which a steering correction is made—is controlled by the magnitude of the convergence control oscillator 41. The lower the convergence oscillator magnitude the higher the rate of convergence will be. For the preferred embodiment, the convergence control oscillator output frequency is approximately one kilohertz (1 KHz).

Still referring to FIG. 5, to provide the steering control signals to the steering control motor 34, the right-/left turn signal 11 is inputted to both right turn on unit 54 and left turn on unit 56. These two units function to provide digital signals on their respective output where a logic one on the output of one unit produces a steering turn in its respective direction while the output of the opposite unit will not produce a steering turn, i.e., its output will be at a logic zero. This condition alternately changes for each unit as the logic states of their respective outputs change. When unit 54 is at a logic one, unit 56 is at a logic zero. Conversely, when unit 54 is at a logic zero, unit 56 is at a logic one. The outputs from right turn on 54 and left turn on 56 are applied to power amplifier 62 via delay units 58 and 60, respectively. Power amplifier 62 amplifies the right turn on 13 and left turn on 15 output signals to provide the steering control signals to the steering control motor 34.

Figure 6:
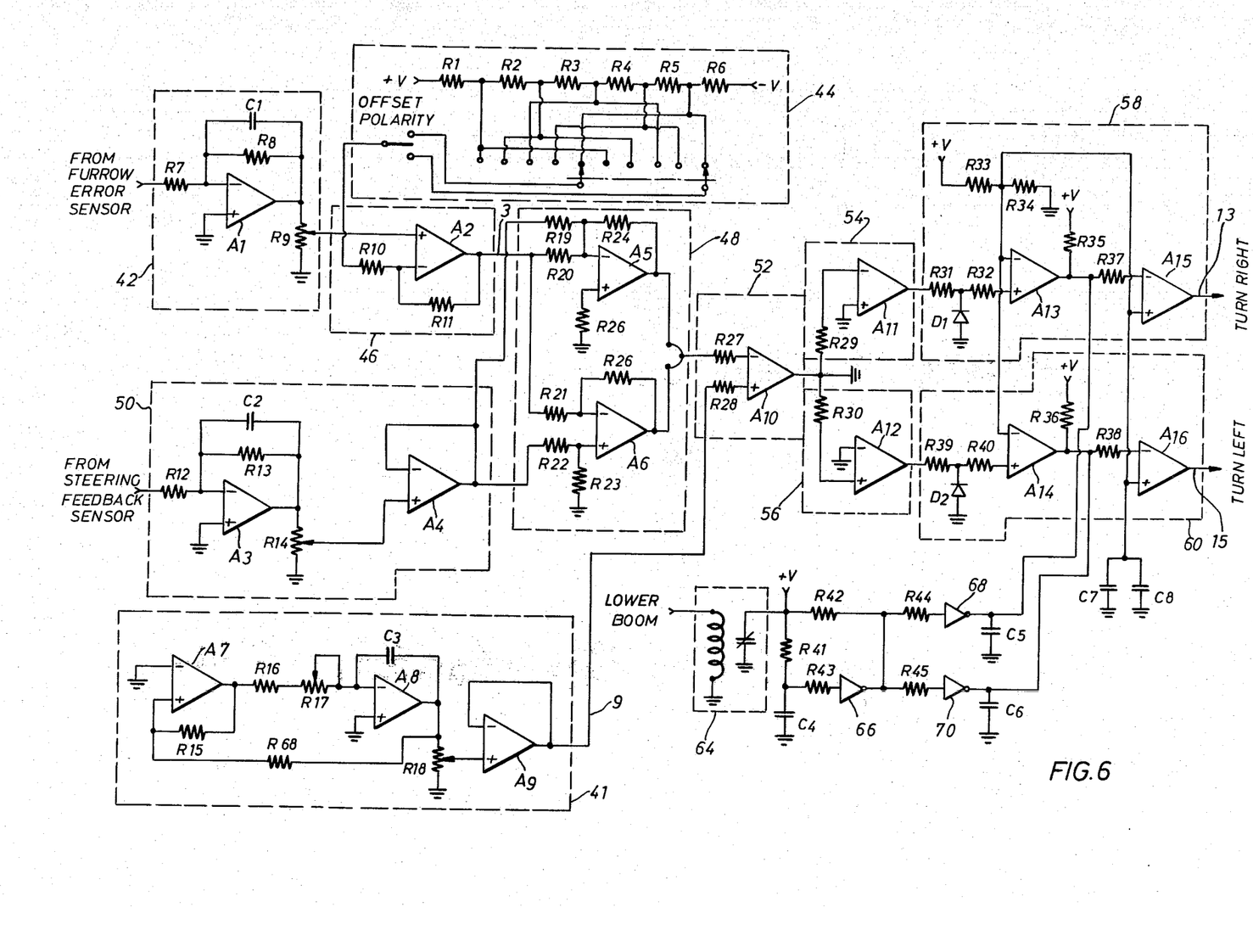
FIG. 6 is a more detailed circuit diagram of a portion of the control means illustrated in FIG. 5.
Figure 7:
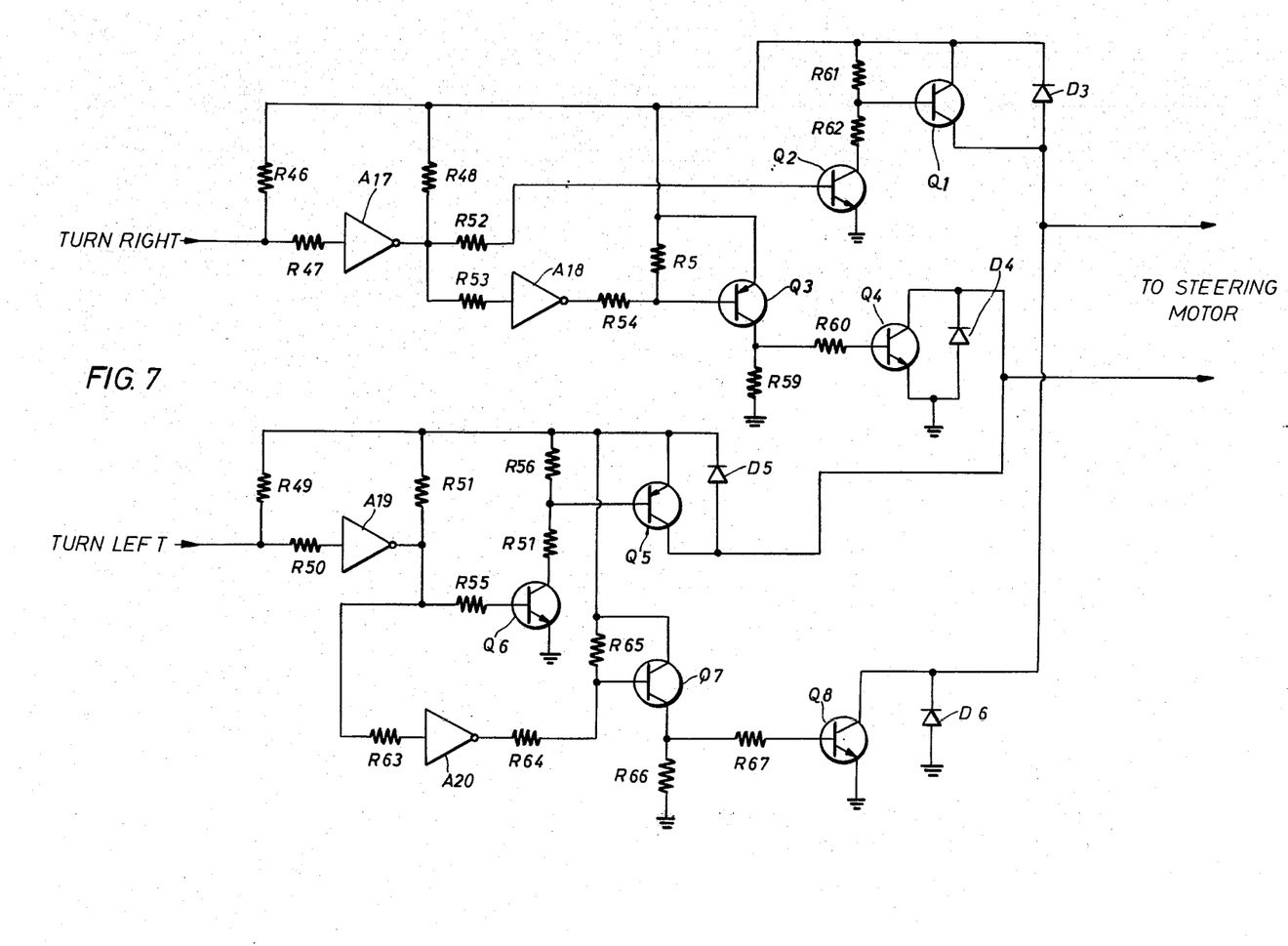
FIG. 7 is a detailed circuit diagram of the power amplifier that provides the drive signal to the steering control motor illustrated in FIG. 4.

Referring now to FIGS. 6 and 7, a detailed circuit diagram of the control means illustrated in FIG. 5 is shown. The operations of the circuits shown in FIGS. 6 and 7 are well known to those of ordinary skill in the art, and a detailed description of their operations will not be provided herein. It will be clear to those of ordinary skill in the art that the values of the various circuit components and voltage associated with the analog amplifiers and transistors depicted in FIGS. 6 and 7 will vary in dependence upon the intended use. In a presently preferred embodiment used in connection with an automatic tractor guidance system for controlling the direction of travel of a tractor, the table below sets out exemplary values which have been found satisfactory.

| TABLE OF COMPONENT VALUES | |
|---|---|
| Resistors | |
| Component | Value (ohms) |
| R57, 60, 62, 69 | 10 |
| R42, 46, 48, 49, 51, 54, 56, 58, 59, 61, 64, 65, 66 | 1K |
| R16 | 2.2K |
| R17, | 10K varibale |
| R7, R12, 31, 39, 43, 44, 45, 47, 50, 52, 53, 52, 55, 63 | 10K fixed |
| R68 | 22K |
| R19 | 33K |
| R35, 36 | 47K |
| R7, 14, 18 | 100K variable |
| All remaining resistors not listed | 100K fixed |
| Capacitors | |
| Component | Value (f) |
| C1, 2 | .1 |
| C3 | 1 |
| C4 | 220 |
| C5, 6 | .01 |
| C7 | 10 |
| C8 | .047 |
| Amplifiers | |
| A1–A12 | LM324 (National Semiconductor) |
| A13–A16 | 3302 (Motorola) |
| 66, 68, 70, A17–A20 | 1411 (Motorola) |
| Q2, Q6 | SK3182 (RCA) |
| Q3, Q7 | SK3183 (RCA) |
| Q1, Q5 | 2N6378 (Motorola) |
| Q4, Q8 | 2N6276 (Motorola) |
| Diodes | |
| D1, D2 | IN912 |
| D3–D6 | IN4005 |
| Relay | |
| 64 | W171-DIP19 (MAGNE-CRAFT) |

Figure 8:
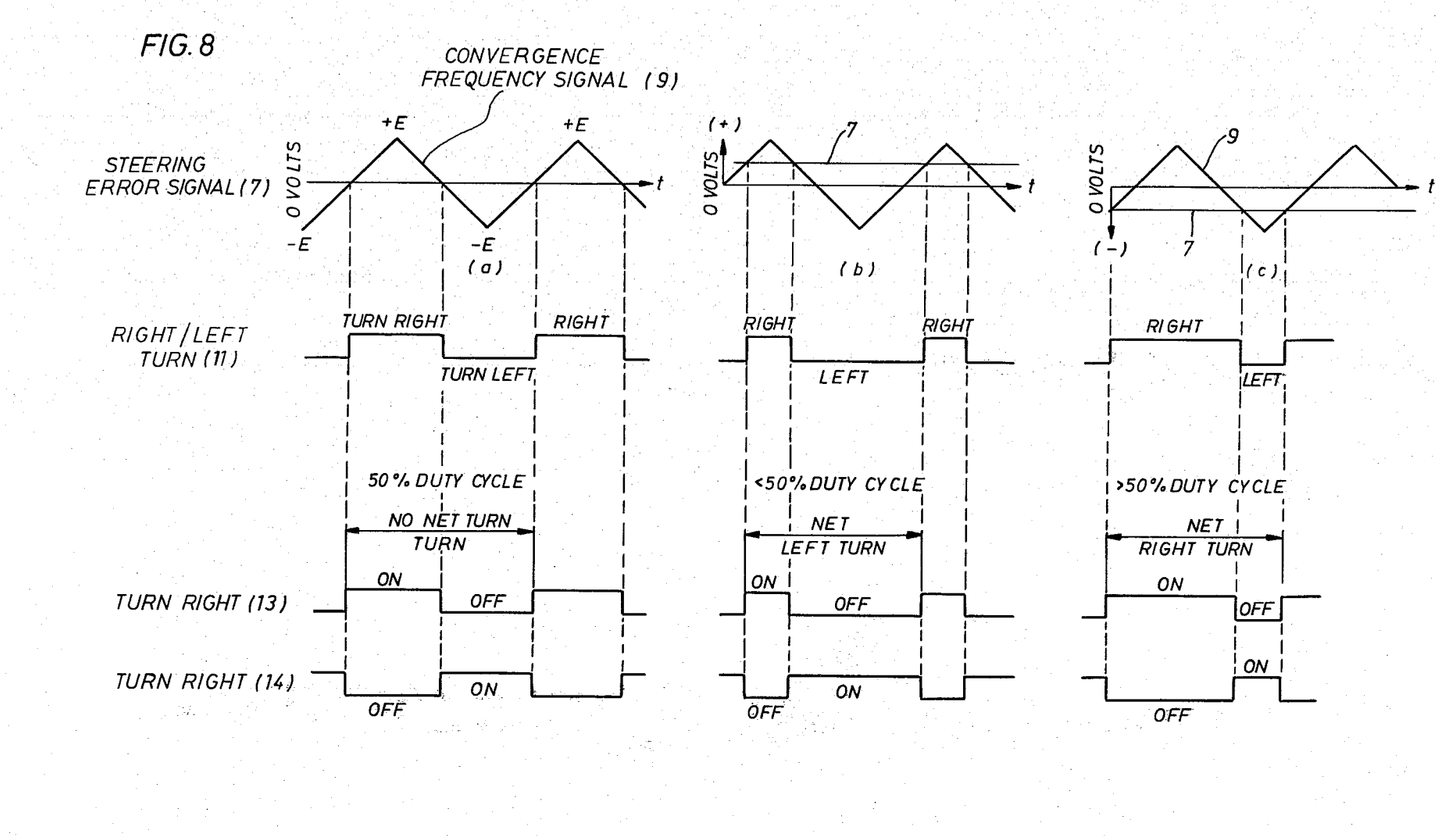
FIG. 8 is an illustration of various electrical signal wave forms which show how the steering control signal is generated by the control means illustrated in FIG. 5.

Turning now to FIG. 8(a), (b) and (c), signal waveforms of the steering error signal 7 outputted by the sum or difference amplifier 48 and the convergence control oscillator frequency signal 9 are shown superimposed in the same drawing. FIG. 8(a) illustrates a condition when the steering error signal 7 is zero volts in magnitude and where the voltage swing of convergence frequency signal 9 is $\pm E$. The right/left turn signal 11 is generated as a function of the comparison of the steering error signal 7 and the convergence frequency signal 9 in the right/left turn comparator 52. When the convergence frequency signal 9 is greater than the magnitude of the steering error signal 7, a logic one is produced for the right/left turn signal 11. Identically, when the convergence frequency signal 9 is less than the steering error signal 7, a logic zero state is generated. By arbitrarily assigning a turn right function to the logic one state of the signal 11 and a turn left to the logic zero state, it is possible to control the steering of the tractor as a function of the duty cycle of signal 11 if a turn control signal both for a right and a left turn is delivered to the steering control motor 34 during each cycle of the convergence frequency signal 9. When the duty cycle is 50% as shown in FIG. 8(a), there is no net turn right or turn left signal to the steering column 36.

Referring to FIGS. 8(b) and 8(c), the operating conditions for a steering error signal 7 having a positive polarity and a steering error signal 7 having a negative polarity are respectively illustrated. For a positive steering error signal 7, a duty cycle less than 50% is generated. This results in a net steering change in the left direction. Similarly, when the steering error signal 7 is negative, a net right turn is effected. As previously mentioned, the control means illustrated in FIG. 5 functions to control the direction of steering of the tractor to cause the right/left turn signal 11 to exhibit a 50% duty cycle. The rate at which a steering correction can be made to the steering of the tractor is a function of the magnitude of the convergence frequency signal 9, a lower magnitude causing a faster steering change than a high magnitude signal.

In operation, the present invention functions to sense both the direction of a guide path and the steering direction of the tractor to produce an error signal that is compared with an oscillator frequency signal. The result of this comparison produces a digital waveform in which the two logic states are assigned the control function of initiating a right or a left turn. In this manner, a 50% duty cycle in the digital waveform will produce no net turning effect in the steering direction of the tractor. Deviations from the 50% duty cycle brought about by a deviation in the direction of travel of the tractor and the direction of the guide furrow result in a steering correction to bring the duty cycle back to 50%. Because of the deviating effects of side forces acting on the tractor as a function of the contour of the land being plowed, etc., it is sometimes necessary to offset the steering of the tractor from the direction of travel of the tractor. Accordingly, means is provided to modify the resulting steering error signal generated from a comparison of the error signals and the feedback from the steering direction by inserting a switch selectable offset voltage into the furrow error signal 3 (see FIGS. 5 and 6).

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. An automatic guidance system for controlling the direction of travel of a tractor to follow a guide path by generating a steering control signal to control the steering direction of the tractor, the system comprising:
    (a) a direction sensor connected to the tractor, for generating a path direction signal indicative of the direction of the path relative to the direction of travel of the tractor;
    (b) a tractor steering means responsive to the steering control signal, for controlling the steering direction of the tractor;
    (c) a tractor steering sensor connected to said steering means, for generating a steering direction of the tractor; and
    (d) a control means responsive to said sensors, for generating the steering control signal, the steering control signal having a predetermined period with a variable duty cycle defined by an uninterrupted sequence of alternate time intervals of right and left turn steering corrections where the total time for each consecutive pair of right and left turn steering corrections is equal to the period of the steering control signal and where equal time intervals for the right and left turn steering corrections represents a 50% duty cycle so that the steering direction of the tractor is effected when the duty cycle of the steering signal deviates from the 50% duty cycle, said control means generating a variable amplitude convergence frequency signal where the amplitude of the convergence frequency signal determines the steering correction sensitivity of the guidance system to errors between the direction of the guide path and the direction of travel of the tractor by varying the rate of convergence of the steering direction to the direction of the path.

2. The guidance system of claim 1, wherein said tractor steering means includes a permanent magnet DC motor connected to the steering wheel assembly of the tractor for controlling the steering direction of the tractor in response to the steering control signal.

3. The guidance system of claim 1, wherein said direction and tractor steering sensors are each a rotary variable differential transformer.

4. The guidance system of claims 1, or 3, wherein said control means comprises:
    (a) first and second amplifiers for respectively amplifying the path direction signal and the steering direction signal;
    (b) an offset control, for generating an error offset voltage to compensate for external side forces acting on the tractor, said side forces tending to alter the tractor's direction of travel without an accompanying change in the steering direction;
    (c) a first differencing amplifier, for generating the difference between the output signal from said first amplifier and the error offset voltage, the output from said differencing amplifier comprising the furrow error signal;
    (d) a steering error amplifier responsive to the output from said second amplifier and the furrow error signal, for generating a steering error signal;
    (e) a convergence control oscillator, for generating the variable amplitude convergence frequency signal, the frequency of the convergence frequency signal determining the period of the steering control signal; and
    (f) a comparison means responsive to the steering error signal and the convergence frequency signal, for generating the variable duty cycle steering control signal having the same fundamental frequency as the convergence signal, the duty cycle of the steering control signal varying as a function of the magnitude and polarity of the steering error signal.

5. The guidance system of claim 4, wherein said steering error amplifier comprises:
   (a) a summing amplifier, for generating the sum of the amplified steering direction signal and the furrow error signal; and
   (b) a second differencing amplifier, for generating the difference between the amplified steering direction signal and the furrow error signal, the output from either said summing amplifier or said second differencing amplifier selected to be the steering error signal.

6. The guidance system of claim 4, wherein said comparison means comprises:
   (a) means for generating a turn right on signal during a first portion of the period of the steering control signal and a turn left on signal during the remaining portion of the period of the steering control signal, the first and second portions comprising binary states of the variable duty cycle steering control signal; and
   (b) a power amplifier responsive to the turn right on and the turn left on signals, for generating power drive signals to said tractor steering means to effect control of the steering direction of the tractor.

7. The guidance system of claim 6, wherein said tractor steering means includes a DC motor connected to the steering wheel assembly of the tractor, said motor responding to the power drive signals to control the steering of the tractor.

8. In an automatic tractor guidance system for steering a tractor to follow a guide path, the tractor including,
   (a) a steering means including a steering wheel for steering the tractor,
   (b) sensors for sensing and generating signals of the travel direction of the tractor relative to the guide path, and of the steering direction of the tractor, and
   (c) means for combining the sensor outputs to obtain a steering error signal whose magnitude and polarity respectively represents the amount of steering correction and steering correction direction required to bring the travel direction of the tractor back to the direction of a guide path,
an improvement comprising:
   a means responsive to said steering error signal for generating a steering control signal for controlling the steering of the tractor through an uninterrupted sequence of steering turn corrections whereby the amount of steering correction and the direction of the steering correction direction of the tractor are controlled by the steering control signal as a function of time, said means generating a variable amplitude convergence frequency signal whose amplitude determines the steering correction sensitivity of the guidance system by enabling the rate of convergence of the direction of travel of the tractor to follow the guide path to be controlled at a given value of the steering error signal.

9. The system of claim 8 wherein said means for generating a steering control signal includes:
   (a) a convergence rate oscillator for generating the variable amplitude convergence frequency signal having a predetermined constant period; and
   (b) a comparator means responsive to the steering error signal and the convergence frequency signal for generating the time dependent steering control signal, said steering control signal having,
      (i) the same period as the convergence frequency signal where each period is divided into two consecutive time portions, a first variable portion during which a right turn correction is effected and a second variable portion during which a left turn correction is effected, and
      (ii) a variable duty cycle defined by the ratio of the first and second variable portions of each period where a 50% duty cycle represents equal first and second portions and results in no net steering correction to the tractor.

10. The system of claim 9 wherein said steering means includes a motor and wherein said comparator means includes a power amplifier responsive to the steering control signal for providing a drive signal to said motor to affect steering of the tractor,
   (a) where deviation of the duty cycle from a 50% duty cycle results in a net steering correction to the tractor, and
   (b) where the rate of convergence of the steering of the tractor to the direction of the guide path is a function of the magnitude of the deviation of the duty cycle from 50%.

11. The system of claim 10 wherein said motor is a permanent magnet DC motor connected to the steering wheel of the tractor.

12. The system of claims 8 or 11 wherein said sensors are each a variable differential transformer.

13. The system of claims 8 or 11 wherein said means for combining the sensor outputs to obtain a steering error signal includes a means for compensating for external side forces acting on the tractor where the side forces tend to alter the direction of travel of the tractor without an accompanying change in the steering direction.

14. A method of controlling a vehicle having a steering system including a steering wheel to follow a guide path comprising the steps of:
   (a) sensing the steering direction of travel of the vehicle;
   (b) sensing the direction of the guide path relative to the direction of travel of the vehicle;
   (c) generating a steering error signal from the sensed direction of the guide path and the steering direction of the tractor, the steering error signal having,
      (i) a magnitude representative of the amount of steering correction needed to steer the vehicle to follow the guide path, and
      (ii) a polarity representative of the steering direction for the steering correction;
   (d) generating a variable amplitude convergence frequency signal having a fixed time period;
   (e) varying the amplitude of the convergence frequency signal to determine the steering correction sensitivity of the steering system for a given value of the steering error signal; and
   (f) comparing the steering error signal to the convergence frequency signal to obtain a steering control signal for controlling the steering of the vehicle, the steering control signal having an uninterrupted sequence of alternate steering correction states in each period of the convergence frequency signal and a duty cycle defined by the ratio of the time for each state during each period where equal time intervals for the states during a period represents a 50% duty cycle, and where the steering direction of the vehicle is effected when the duty cycle deviates from 50% thereby controlling the steering of the vehicle as a function of time.

15. The method of claim 14 wherein the rate of convergence of the vehicle to follow the guide path is controlled by the amplitude of the convergence frequency signal.

* * * * *

UNITED STATES PATENT AND TRADEMARK OFFICE
CERTIFICATE OF CORRECTION

PATENT NO. : 4,366,756

DATED : January 4, 1983

INVENTOR(S) : Jerry W. Brum

It is certified that error appears in the above—identified patent and that said Letters Patent is hereby corrected as shown below:

Col. 8, line 11 - insert --signal indicative of the steering direction-- after "direction"

Signed and Sealed this

Twenty-fourth Day of May 1983

[SEAL]

Attest:

DONALD J. QUIGG

Attesting Officer     Acting Commissioner of Patents and Trademarks